A. W. HERBST AND C. C. J. CULMER.
DUMPING TRUCK.
APPLICATION FILED MAR. 23, 1921.

1,420,315.

Patented June 20, 1922.
4 SHEETS—SHEET 1.

Inventors:
Abram W. Herbst, Claude C. J. Culmer,
By their Attorney, Geo. Wm. Miatt

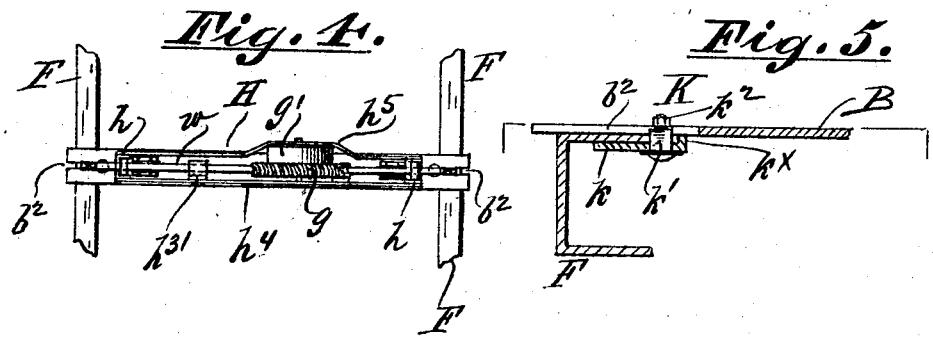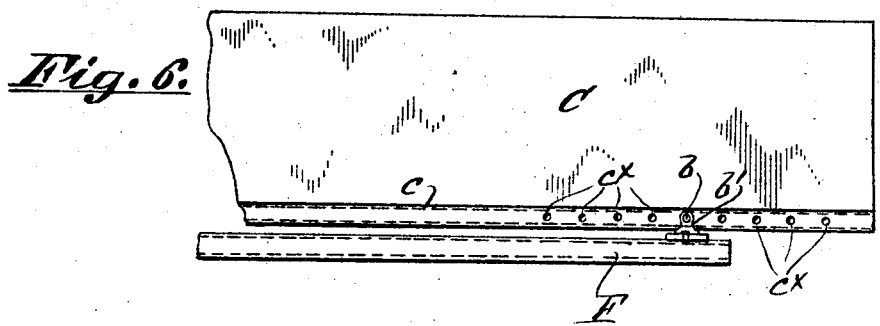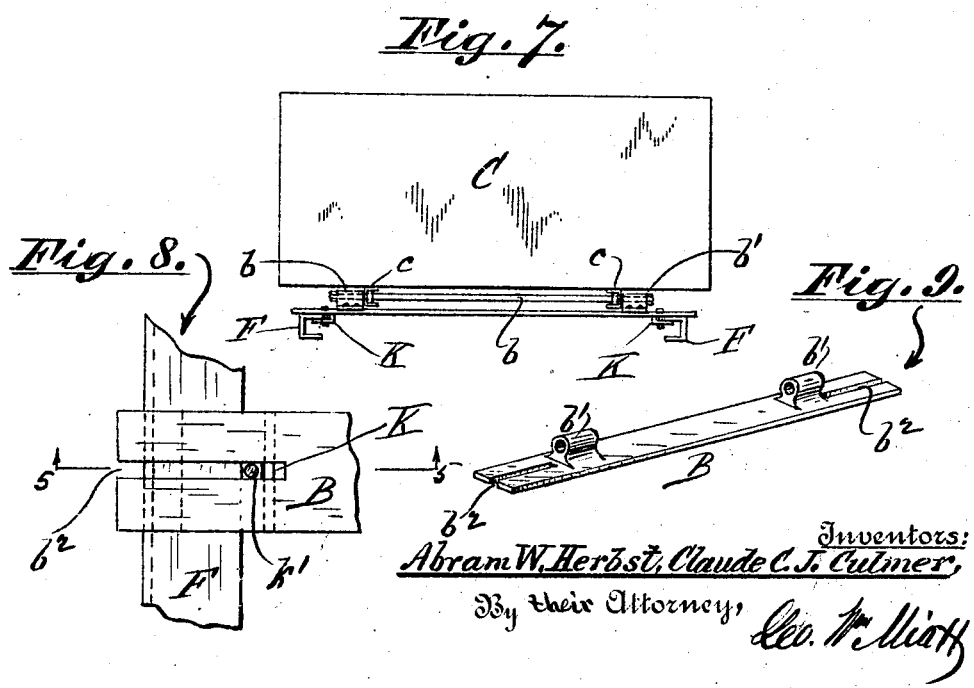

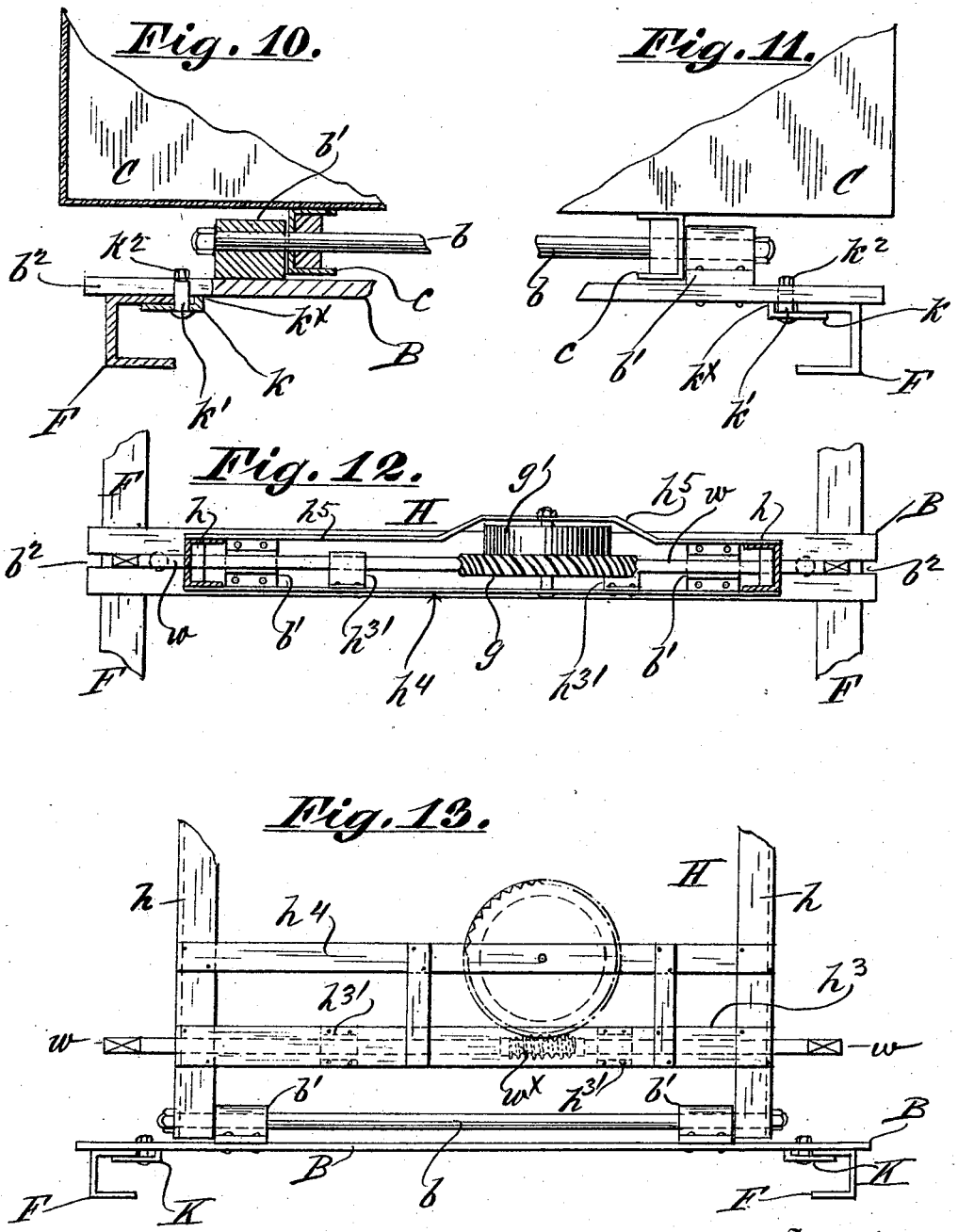

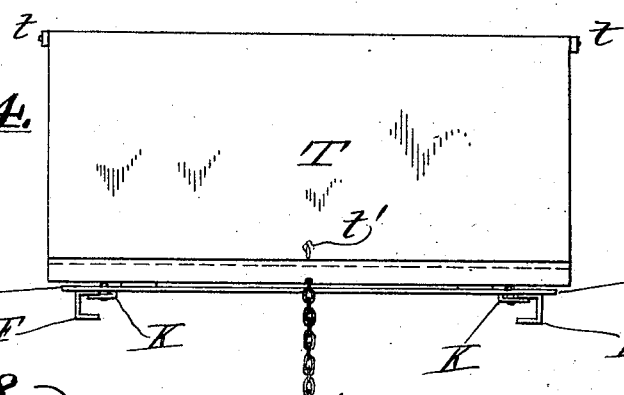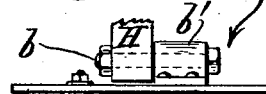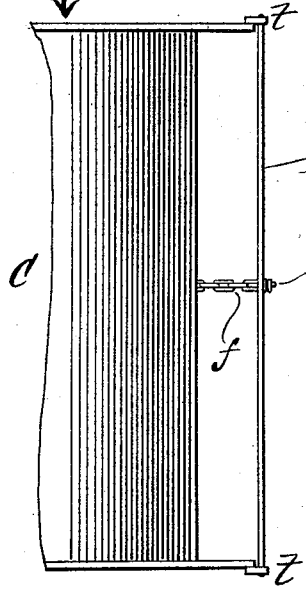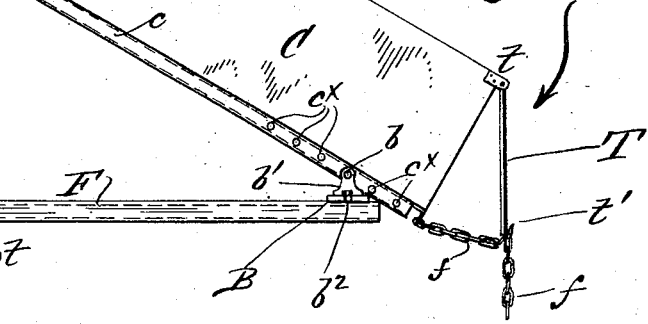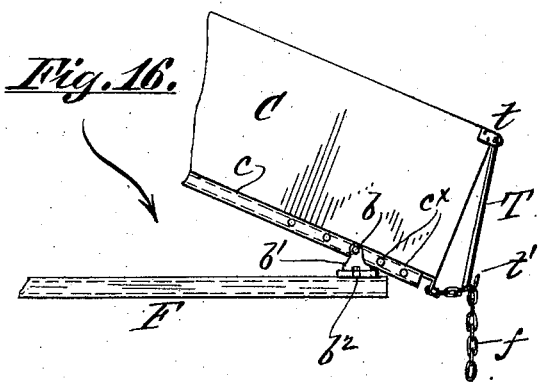

UNITED STATES PATENT OFFICE.

ABRAM W. HERBST AND CLAUDE C. J. CULMER, OF NEW YORK, N. Y., ASSIGNORS TO ECONOMY HOIST & BODY CO., INC., OF NEW YORK, N. Y.

DUMPING TRUCK.

1,420,315.

Specification of Letters Patent. Patented June 20, 1922.

Application filed March 23, 1921. Serial No. 454,747.

*To all whom it may concern:*

Be it known that we, ABRAM W. HERBST, a citizen of the United States, and a resident of the borough of Manhattan, city, county, and State of New York, and CLAUDE C. J. CULMER, a subject of the King of England, and a resident of the borough of Manhattan, city, county, and State of New York, have invented certain new and useful Improvements in Dumping Trucks, of which the following is a specification.

While applicable generally to vehicles provided with dumpage bodies adapted to tip and discharge the load or contents thereof, our improvements are designed more particularly for embodiment and use in conjunction with the dumping mechanism of automobile trucks of this class; our main objects being, to attain simplicity and economy of construction, combined with facility and efficiency of operation; to adapt our dumpage body and mechanism to chassis frames of various widths and lengths; and to attain a standardization and interchangability of parts, as and for the purposes hereinafter fully set forth,—the invention consisting in the specific construction, combination, and arrangement of elements and devices described and claimed, whereby these desirable results are assured.

In the accompanying drawings,

Fig. 4, is a plan of the hoist mechanism;

Fig. 5, is a sectional detail, on a larger scale, and taken upon plane of line 5—5, Fig. 8, showing clamping means for securing our adjustable bridge plates to the longitudinal members of a chassis frame;

Fig. 6, is a side elevation of rear portions of a truck body and chassis frame, illustrating our method of effecting longitudinal adjustment of the truck body or container on the chassis frame;

Fig. 7, is a rear end elevation of the parts shown in Fig. 6;

Fig. 8, is a top view of the parts shown in Fig. 5, the clamping nut being omitted;

Fig. 9, is a perspective view of one of our chassis bridge plates;

Fig. 10, is a sectional detail of one end of the fulcrum mount for the truck body or container;

Fig. 11, is an elevation of the other end of said mount;

Fig. 12, is a plan upon a larger scale, of the hoist mechanism, the supporting frame being shown in horizontal section;

Fig. 13, is an elevation thereof;

Fig. 14, is a rear view of the body provided with means for adjusting the area of tail board discharge;

Figs. 15 and 16, are side elevations of the rear portion of the truck body, illustrating the control of tail board discharge;

Fig. 17, is a top view of said parts as positioned in Fig. 15.

Fig. 18, is a detail view showing a modification in the means of fulcrum support provided in our duplicate interchangeable bridge plates.

Figure 1:
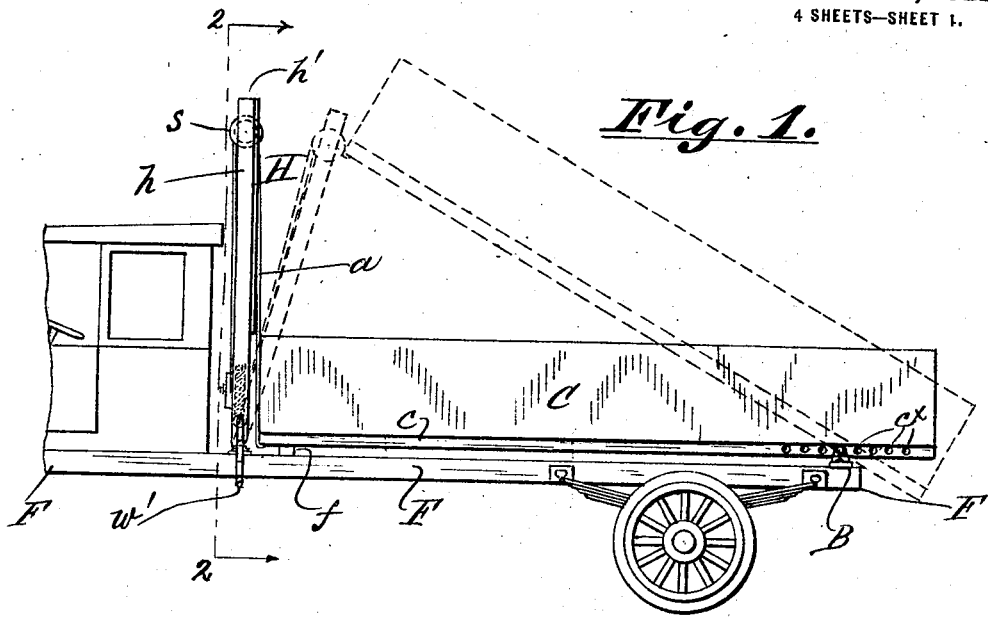
Fig. 1, is a side elevation of our dumpage body or container and adjacent parts of an auto-truck.

F, F, in the drawings, represent the longitudinal members of a chassis frame of ordinary and well known construction; and C, the truck body or load container. In normal horizontal position the forward end of the box or container C, rests on a cross bar $f$, extending between the said longitudinal members F, F, of the frame as indicated in Fig. 1, its rear end being pivotally supported upon, between and above the rear portions of said longitudinal members F, F, of the chassis frame, on a fulcrum rod pintlet bar $b$, mounted in and between bearings $b'$, $b'$, integral with one of the bridge plates B, two of which latter are provided for each chassis frame,—one, as above stated for the pivotal support of the container C, the other for the pivotal support of the frame H, on which the hoisting mechanism is mounted.

These two bridge plates B, B, one of which is shown in perspective in Fig. 9, of the drawings, are duplicates, each being provided with knuckle bearings $b'$, $b'$, upon the upper side thereof, for the mounting of a pintlet bar or fulcrum rod $b$ as before stated. In this connection see particularly Figs. 10, 11, and 13, which show these fulcrum mounts on a larger scale than the other views.

The knuckle bearings $b'$, $b'$, of the bridge plates may be formed integral therewith as indicated in Fig. 9, or riveted or otherwise rigidly attached thereto as indicated in the other figures of the drawings.

The distance between the knuckle bearings $b'$, $b'$, on each bridge plate B, is arranged in accordance with a prescribed width of dumpage body or container C, as manufactured for a particular purpose; and this particular size of body or container C, is adapted for use on chassis frames of different dimensions by forming the ends of the said fulcrum bridge plates B, B, with elongate slots $b^2$, $b^2$, for the accommodation of adjustable clamping means by which said bridge plates B, B, may be rigidly attached to the upper sides of the aforesaid longitudinal members F, F, of the chassis frame irrespective of the width of the latter. Obviously various well known mechanical expedients may be resorted to with like result in the formation of the clamping means provided for this purpose,—the clamps K, K, shown in the drawings being by way of exemplification (see particularly Figs. 5, 10, and 11) and consisting each of a grip plate $k$, provided with a screw stud $k'$, and nut $k^2$, the screw stud $k'$, being adapted to extend through one of the slots $b^2$, in the end of a bridge plate B, when the grip plate $k$, is positioned against the under side of the upper flange of a longitudinal member F, of the chassis frame, and the nut $k^2$, being utilized to effect a clinch hold against the upper surface of the bridge plate B, as shown in several figures of the drawings,—a lip $k^x$ being provided on the grip plate $k$, to bear against the under side of said bridge plate B, and thus prevent tilting and insure the proper alignment of said grip plate $k$, as related to the flange of the chassis member F.

By our standardized and interchangeable fulcrum bridge plates B, B, we are thus not only enabled to fit our body box or container C, to any width of chassis frame, but we also obviate the necessity for riveting the hinges directly to the chassis frame as heretofore, which is a practical advantage in a commercial sense. Furthermore, by thus standardizing the size and shape of our duplicate fulcrum bridge plates B, we are enabled to materially reduce cost of production and to facilitate installation of our dumpage container and mechanism on the various forms and sizes of chassis frames manufactured.

Figures 2, 3:
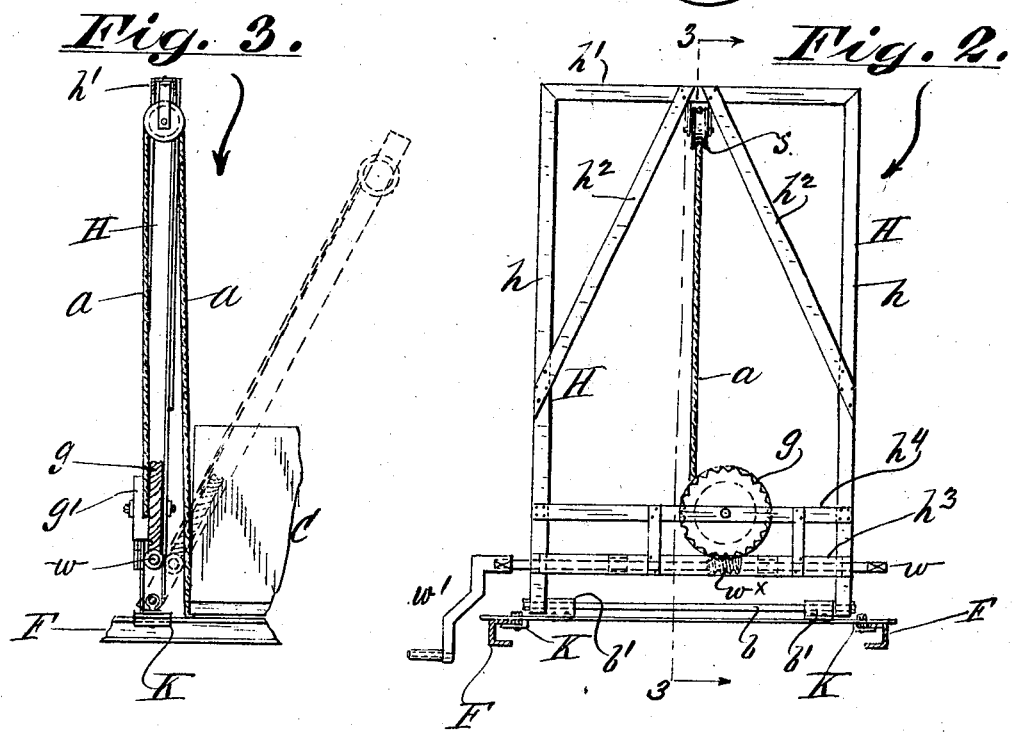
Fig. 2, is a vertical transverse section taken upon plane of line 2—2, Fig. 1 and looking rearward.
Fig. 3, is a vertical section taken upon plane of line 3—3, Fig. 2.

In Figs. 6, 7, 10, 11, 14 and 16, we have shown the knuckle bearings $b'$, $b'$, on our fulcrum bridge plates B, B, as positioned beyond or on the outer side of the parts particularly connected therewith, whereas in Fig. 2, 12 and 13, they are shown as positioned between and on the inner sides thereof, so that we do not limit ourselves in this respect,—the result being the same in either case, in that they afford suitable support for the pintlet rods $b$, as related to the parts fulcrumed thereon. Furthermore, instead of a single pintlet rod or bar $b$, being provided to extend through both the said knuckle bearings $b'$, $b'$, on each fulcrum bridge plate B, as shown in most of the figures of the drawings, it is obvious that separate pintlets $b$, may be used for each knuckle bearing $b'$, as shown in Fig. 18, if so preferred, and with like result.

It is to be noted in this connection that said knuckle bearings $b'$, $b'$, are positioned alike in both the front and the rear fulcrum bridge plates shown in the drawings, so as to be interchangeable as above set forth, and that the hoist frame H, is pivotally supported on the outer sides of said knuckle bearings $b'$, $b'$, on the forward bridge plate, while the container body C, is pivotally supported on the inner sides of the said knuckle bearings on the rear bridge plate, as will be seen clearly by a comparison of Figs. 10 and 11, with Figs. 12 and 13, of the drawings.

Our fulcrum bridge plates B, B, are not only laterally adjustable in function as regards the width or distance between the longitudinal members F, F, of the chassis frame as above set forth, but they are obviously for like reason, and by the same means, adjustable with respect to the length of said side members of the chassis frame, so as to compensate for variations in length of either the chassis frame or of the container C, as related to each other.

As a further means of adapting our container and dumpage mechanism to the various or varying requirements of use, we also provide for the adjustment of the rear portion of the container C, upon and as related to the pintlet rod $b$, on which it is fulcrumed, as will be understood by reference particularly to Figs. 1 and 6 of the drawings. This we accomplish by forming the longitudinal girders $c$, $c$, on the under side of the bottom of the container C, each with a series of coincidental pintlet holes $c^x$, $c^x$, so that the distance of fulcrum support from the rear end of the container C, may be regulated within the limits prescribed by said series of pintlet holes $c^x$, $c^x$. Thus, also, the available extent of dumping inclination which may be imparted to the container may be varied as may be found expedient in practice, since it is evident that the distance between the pivotal support of the hoist-mechanism, and of the rear of fulcrum support of the container, will govern the degree of angularity attainable between container and hoist frame H.

That is to say, the nearer these two lines of pivotal support are located as related to each other the steeper will be the inclination that may be imparted to the container by the hoist mechanism.

The container tilting-hoist mechanism is mounted on the frame H, which latter is pintlet-supported by the bearings $b'$, $b'$, of the forward bridge plate B, as hereinbefore stated. Said frame is preferably made of angle or channel iron, and consists of the vertical side members $h$, $h$, top member $h'$, braces $h^2$, $h^2$, and transverse members $h^3$, $h^4$, and $h^5$. The worm shaft $w$, is mounted on and between the side members $h$, $h$, of the frame H, and also is supported medially by means of bearings $h^{31}$, $h^{31}$, on the lower cross member $h^3$, of the frame, as will be seen by reference more particularly to Figs. 12 and 13, of the drawings,—the extremities of said worm shaft $w$, being protuberant beyond the said side members $h$, $h$, and one or both ends being adapted for engagement with the socket arm of a crank $w'$, as indicated in Figs. 1 and 2.

The worm gear $g$, and hoist drum $g'$, are rotatably mounted between the transverse members $h^4$, and $h^5$, of the hoist frame,— the gear $g$, meshing with the worm $w^x$, on the shaft $w$, as indicated in dotted lines in Fig. 13, so that said gear $g$, and its drum $g'$, may be cranked from one or both extremities of the worm shaft $w$, as above intimated. A sheave $s$, is mounted centrally on the top member $h'$, of the frame H, between the braces $h^2$, $h^2$, as shown in Fig. 2; and the gear $g$, and drum $g'$, are preferably mounted off center as related to the vertical center of the frame H, as shown in said figure, so that the wire cable $a$, or equivalent flexible connection may extend from said drum $g'$, over said sheave $s$, and down to the bottom of the container C, (to which it is fastened) in substantially perpendicular alignment, thereby obviating danger of the twisting of the cable $a$, and reducing frictional resistance of operation to a minimum, while effecting the application of the power in the most direct and effective manner. It is to be noted in this connection that we attach the hoist cable directly to the lower forward portion of the container C, without intermediatory arms or devices of any kind, thereby attaining simplicity and economy of construction, as well as of operation, with a maximum degree of tilting capacity; and this we are enabled to accomplish mainly because our hoist frame H, is not rigidly mounted as heretofore, but is pivotally supported at its lower extremity so as to adapt itself automatically to the angularity assumed by container C, when raised and tilted on its rear fulcrum support as indicated by dotted lines in Fig. 1.

As the container C, is lowered into normal horizontal position after the dumping of its contents has been effected, the hoist frame H, again, and automatically, assumes its normal upright position, with the parts in the relative positions shown in solid lines in Figs. 1, 2 and 3 of the drawings.

In order to control and regulate the discharge of the contents of the container C, in accordance with the character of the material involved, we hinge or pivotally mount our tail gate T, substantially as illustrated in Figs. 14 to 17 inclusive of the drawings,— the said gate T, being suspendably supported, as at $t$, $t$, between the upper end edges of the sides of the container C; and the lower edge of said tail board or gate T, being provided with a hook $t'$, or equivalent device, for engagement with a coupling chain $f$, or other flexible mechanical expedient whereby the discharge area between the rear bottom edge of the container C, and the bottom edge of its said tail gate may be regulated and prescribed, as indicated by a comparison of Figs. 15 and 16, according to circumstances and requirements.

Our improvements are the result of practical and experimental investigation undertaken for the express purpose of obviating difficulties incidental to the make and operation of dumpage trucks heretofore revealed in the state of the art and commerce relating thereto. By them we are enabled to attain a simplicity and standardization of parts that renders duplication and replacement thereof possible in a commercial sense, while at the same time we facilitate the manipulation of the dumpage mechanism with a minimum expenditure of power and labor. Furthermore, all the operative parts are positioned above the chassis frame, so that there can be no interference with, or damage resultant from contact with, the running gear, etc., of an auto-truck to which our dumpage superstructure may be applied, and to which the same may be fitted and adapted irrespective of the size of the chassis frame or manufacture of truck,—our invention relating entirely to such dumpage superstructure as a unitary appliance for vehicular transportation means generally.

It must be remembered that in thus applying our container and dumpage mechanism to an auto-chassis or other form of supporting truck frame, the only parts attachable directly thereto are our fulcrum bridge plates B, B, and as these are interchangeable duplicates it is obvious that the installation may be effected expeditiously and at slight cost for labor; and that all this is accomplished without altering, weakening or damaging the truck frame in any particular,—our slotted bridge plates B, B, and their clamping means K, K, rendering even the formation of bolt or screw holes unnecessary.

It is to be understood that by the term "fulcrum bridge plate" as used herein, and particularly in the claims, we mean to include any form of transverse plate supported on the vehicle frame and provided with pivotal means for the mounting of either the hoist frame or the container. Likewise that by the term "container" we mean to include any dumpage box or truck body substantially of the character herein described.

What we claim as our invention and desire to secure by Letters Patent is,

1. In a dumpage vehicle of the character designated, in combination, two fulcrum bridge plates mounted on the vehicle frame, and extended from one longitudinal member to the other with a knuckle bearing near each end, a hoist frame and a mechanism pivotally supported upon and above one of said bridge plates, and a container pivotally supported upon and above the other said bridge plate, and a hoist cable connecting the forward end of said container with said hoist mechanism, said fulcrum bridge plates being independently adjustable upon the vehicle frame and with relation to each other, for the purpose described.

2. In a dumpage vehicle of the character designated, in combination with the longitudinal members of the vehicle frame, a fulcrum bridge plate mounted transversely thereon, and formed with slotted extremities, and clamping devices for adjustably securing said bridge plate on said longitudinal members of the frame, consisting each of a grip plate, a screw stud extending through a slotted portion of the bridge plate, and a clinch nut engaging with said screw stud, as and for the purpose set forth.

ABRAM W. HERBST.
CLAUDE C. J. CULMER.

Witnesses:
DOROTHY MIATT,
GEO. WM. MIATT.